(12) United States Patent
Tsukada et al.

(10) Patent No.: US 9,203,096 B2
(45) Date of Patent: Dec. 1, 2015

(54) AIR BATTERY SYSTEM

(71) Applicant: NISSAN MOTOR CO., LTD., Kanagawa (JP)

(72) Inventors: Yoshiko Tsukada, Yokohama (JP); Wataru Ogihara, Zushi (JP); Atsushi Miyazawa, Kamakura (JP); Mori Nagayama, Yokohama (JP); Nobutaka Chiba, Yokohama (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 34 days.

(21) Appl. No.: 14/352,546

(22) PCT Filed: Oct. 12, 2012

(86) PCT No.: PCT/JP2012/076489
§ 371 (c)(1),
(2) Date: Apr. 17, 2014

(87) PCT Pub. No.: WO2013/058192
PCT Pub. Date: Apr. 25, 2013

(65) Prior Publication Data
US 2014/0287329 A1    Sep. 25, 2014

(30) Foreign Application Priority Data

Oct. 19, 2011   (JP) .................. 2011-229396

(51) Int. Cl.
| | |
|---|---|
| *H01M 12/04* | (2006.01) |
| *H01M 12/06* | (2006.01) |
| *H01M 2/38* | (2006.01) |
| *H01M 6/50* | (2006.01) |
| *H01M 8/04* | (2006.01) |
| *H01M 2/40* | (2006.01) |

(52) U.S. Cl.
CPC .............. *H01M 6/5077* (2013.01); *H01M 2/38* (2013.01); *H01M 2/40* (2013.01); *H01M 8/04276* (2013.01); *H01M 12/04* (2013.01); *Y02E 60/50* (2013.01)

(58) Field of Classification Search
None
See application file for complete search history.

(56) References Cited

U.S. PATENT DOCUMENTS

| | | | |
|---|---|---|---|
| 4,521,497 A | 6/1985 | Tamminen | |
| 5,049,457 A * | 9/1991 | Niksa et al. | .................. 429/405 |

(Continued)

FOREIGN PATENT DOCUMENTS

| | | |
|---|---|---|
| WO | 9205598 A1 | 4/1992 |
| WO | 9206514 A1 | 4/1992 |
| WO | 2008133978 A1 | 11/2008 |

OTHER PUBLICATIONS

Communication with extended European search report dated Feb. 4, 2015 from the corresponding European Patent Application No. 12840904.2.

*Primary Examiner* — Gregg Cantelmo
(74) *Attorney, Agent, or Firm* — Young Basile

(57) ABSTRACT

In an air battery system, a decrease in power output and an increase in inner pressure during discharge are prevented even when deposition of the reaction product increases with the discharge and the volume of the electrolytic solution increases with progress of the reaction. The air battery system includes an air battery a reservoir tank to reserve electrolytic solution to be supplied to the air battery and a reaction product sump to store reaction product produced in the air battery, the reaction product sump provided between the air battery and the reservoir tank.

9 Claims, 2 Drawing Sheets

(56) References Cited

U.S. PATENT DOCUMENTS

| | | |
|---|---|---|
| 5,952,117 A | 9/1999 | Colborn et al. |
| 6,475,653 B1 | 11/2002 | Gomez |
| 2002/0034679 A1* | 3/2002 | Iarochenko et al. ............ 429/81 |
| 2004/0096721 A1* | 5/2004 | Ohlsen et al. ................... 429/34 |
| 2008/0096087 A1* | 4/2008 | Kulakov ......................... 429/35 |

* cited by examiner

AIR BATTERY SYSTEM

CROSS REFERENCE TO RELATED APPLICATION

The present application claims priority to Japanese Patent Application No. 2011-229396, filed Oct. 19, 2011 and incorporated herein in its entirety.

TECHNICAL FIELD

The present invention relates to an air battery system that includes an air battery and a reservoir tank for reserving electrolytic solution to be supplied to the air battery.

BACKGROUND

An example of air batteries is disclosed in Japanese Patent Unexamined Publication No. Hei6-501128, where the air battery is referred to as a "cell". The cell disclosed in Japanese Patent Unexamined Publication No. Hei6-501128 includes a cathode and an anode facing the cathode, a vertically extending electrolysis region between them and a housing to contain electrolyte.

The housing includes a sump with an upper and a lower region, said sump being of a size to contain enough aluminum hydroxide precipitate so as to permit the cell to continue operating after saturation of the electrolyte has taken place, with provision for convective passage of electrolyte from the upper region of the sump to the electrolysis region and at least one channel for convective passage of electrolyte from the electrolysis region to the upper region of the sump.

SUMMARY OF INVENTION

However, the unsolved problems with the above-described cell disclosed in Japanese Patent Unexamined Publication No. Hei6-501128 include a decrease in power output in the discharge, and an increase in inner pressure of the battery due to an expansion of electrolytic solution. These problems are caused by an increase in volume of the electrolytic solution with progress of the reaction because a reaction product is produced as a result of discharge of the battery.

To cope with these problems, it is an object of the present invention to provide an air battery system which neither decreases in power output, nor increases in inner pressure, even when deposition of a reaction product increases as a result of discharge and the volume of electrolytic solution increases with progress of the reaction.

According to the present invention aiming to solve the above-described problems, an air battery system includes an air battery and a reservoir tank to reserve electrolytic solution to be supplied to the air battery. In the embodiments herein, a reaction product sump to store a reaction product produced in the air battery is provided between the air battery and the reservoir tank. This reaction product sump is elastically deformable according to an increase of the inner pressure due to production of the reaction product.

With this structure, the reaction product produced in the air battery can be stored in the reaction product sump. In this case, the reaction product sump elastically deforms according to an increase of the inner pressure due to production of the reaction product. Therefore, the inner pressure does not increase even when deposition of the reaction product increases as a result of discharge and the volume of the electrolytic solution increases with progress of the reaction.

According to the present invention, the decrease in power output and the increase in inner pressure can be prevented even when deposition of the reaction product increases as a result of the discharge and the volume of the electrolytic solution increases with progress of the reaction.

DESCRIPTION OF EMBODIMENTS

Figure 1:
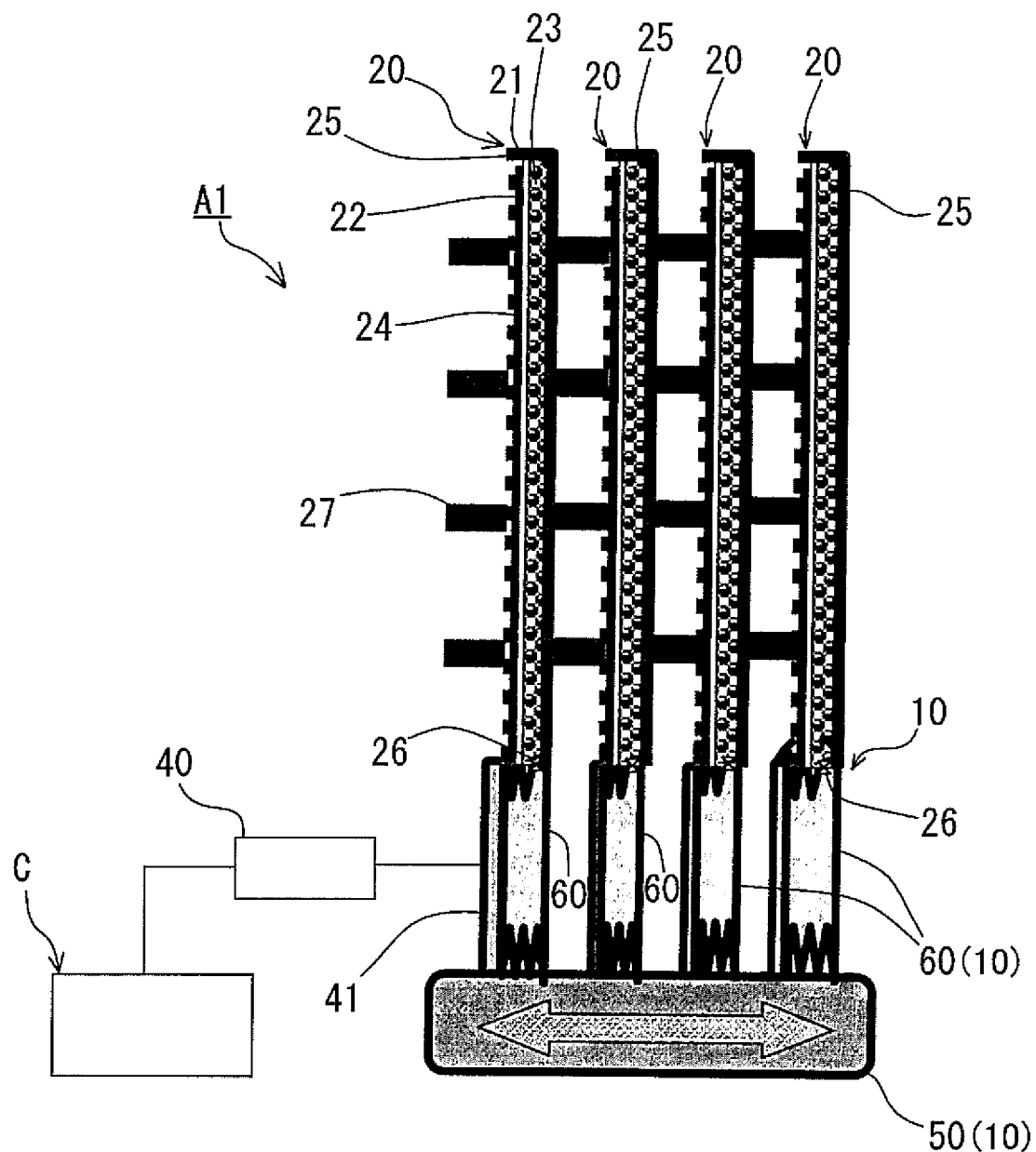
FIG. 1 is a schematic explanatory view of an air battery system according to the first embodiment of the present invention.

Hereinafter, an embodiment of the present invention will be described with reference to the drawings. FIG. 1 is a schematic explanatory view of an air battery system according to the first embodiment of the present invention.

The air battery system A1 according to the first embodiment of the present invention includes a battery holder 10, a plurality of air batteries 20, a pressure and vibration generator 40, and a controller C.

The battery holder 10 includes a reservoir tank 50 and attaching/detaching members 60 that also serve as reaction product sumps, in which the attaching/detaching members 60 are disposed integrally with the reservoir tank 50 on the upper side thereof in the direction of the gravity vector. This configuration can simplify the structure, and can also cause gravity fall of the reaction product (described below) down to the attaching/detaching members 60. In the first embodiment, the air batteries 20, the attaching/detaching members 60 and the reservoir tank 50 are arranged in descending order along the direction of the gravity vector.

The reservoir tank 50 reserves the electrolytic solution W to be supplied to the air batteries 20 that are attached to the attaching/detaching members 60 (described in detail below), and is configured in the shape of a horizontally-long cuboid. The reservoir tank 50 has a suitable volume according to the size and number of the air batteries 20.

The attaching/detaching members 60 detachably hold the plurality of air batteries 20, and have a sufficient volume to contain the reaction product produced in the attached air batteries 20. This structure prevents the increase in inner pressure of the air batteries 20.

The "reaction product" is a hydroxide or an oxide that is produced as a result of discharge.

In the first embodiment, four air batteries 20 can be attached at once, however the present invention is not limited thereto.

The attaching/detaching members 60 of the first embodiment have an expandable/shrinkable structure that expands/shrinks according to the inner pressure. Specifically, the expandable/shrinkable structure is a bellows structure that elastically deforms according to an increase of the inner pressure due to production of the reaction product in the electrolytic solution and the like. However, the present invention is not limited to the bellows structure, and the attaching/detaching members 60 may have any structure that is expandable/shrinkable according to a change of the inner pressure due to the electrolytic solution and the like.

Each of the air batteries 20 includes a cathode 22 and an anode 23 disposed on front and back faces (upper and lower faces in the figure) of a separator 21, and a liquid tight/gas permeable membrane 24 (hereinafter, referred to as a "waterproof membrane") laminated on the outer face of the cathode 22, and is housed in a case 25.

Each of the cases 25 includes an injection opening at the lower end in the figure, and is open at one side. At each of the injection openings, a valve 26 is disposed which permits injection of the electrolytic solution by means of pressure.

On each of the waterproof membranes 24, aeration ensuring members 27 are disposed at regular intervals so as to ensure aeration gaps between air batteries 20 adjacent in the vertical direction.

The pressure and vibration generator 40 of the first embodiment presses and vibrates the attaching/detaching members 60. The pressure and vibration generator mechanism 40 includes, for example, a vibration motor, and is connected to vibrating and pressurizing plates 41 of the attaching/detaching members 60 so as to be capable of applying pressure and vibration to the attaching/detaching members 60.

The controller C includes a CPU (central processing unit) and an interface circuit, and has a function of driving the pressure and vibration generator mechanism 40 at given time intervals by running a suitable program. This function is referred to as a "pressurizing and vibrating means C1".

A "given time interval" refers to a given discharge time period, which is specifically set based on the amount of the reaction product and the like. By causing a vibration at the given time intervals, the produced reaction product can be prevented from being deposited in the air batteries 20.

In the first embodiment, a vibration is caused in the attaching/detaching members 60. However, a vibration may be caused in the reservoir tanks 50.

In the air battery system A1 with the above-described configuration according to the first embodiment, the pressure and vibration generator 40 presses the attaching/detaching members 60 to inject the electrolytic solution into the air batteries 20 through the valves 26.

The reaction product produced as a result of discharge is precipitated in the attaching/detaching members 60, and the volume of the attaching/detaching members 60 increases (expands) due to the bellows structure (expandable/shrinkable structure). Therefore, an increase in inner pressure can be prevented.

After the given time period has elapsed, the pressure and vibration generator 40 causes a vibration in the attaching/detaching members 60. The vibration promotes circulation of the electrolytic solution 20 in the air batteries, and also promotes precipitation of the produced reaction product.

Figure 2:
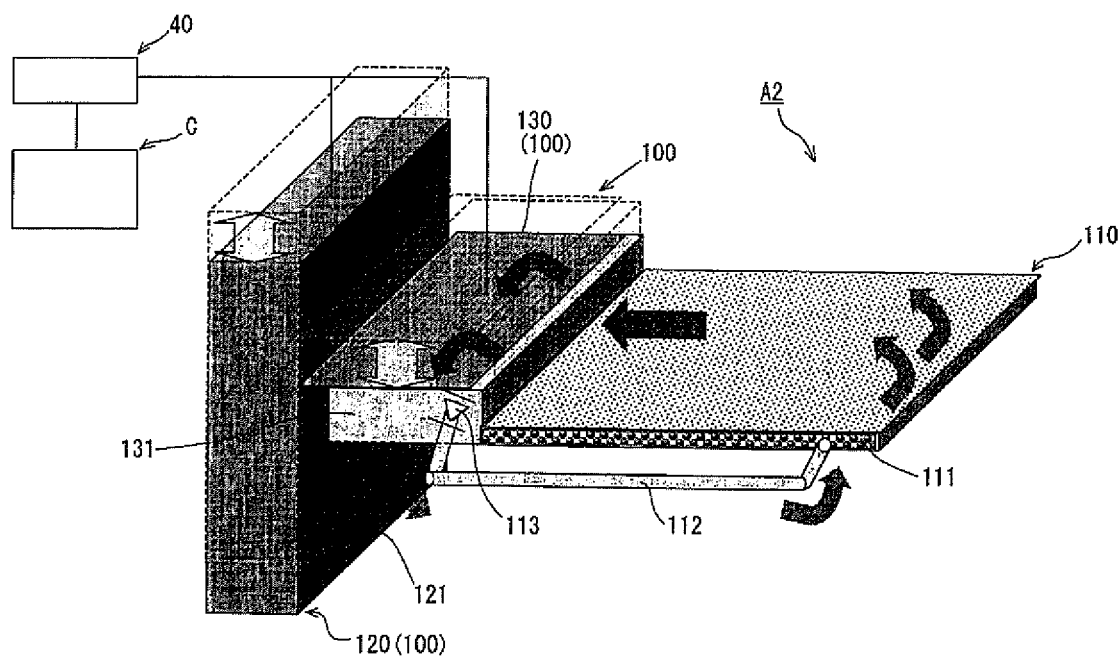
FIG. 2 is a schematic explanatory view of an air battery system according to the second embodiment of the present invention.

Next, an air battery system A2 according to the second embodiment of the present invention will be described with reference to FIG. 2. FIG. 2 is a schematic explanatory view of the air battery system according to the second embodiment of the present invention. The same or similar components as those of the above-described embodiment are indicated by the same reference numbers, and the descriptions thereof are omitted.

The air battery system A2 according to the second embodiment of the present invention includes an air battery holder 100, an air battery 110, a pressure and vibration generator 40 and a controller C. The air battery holder 100 includes a reservoir tank 120 and an attaching/detaching member 130 that also serves as a reaction product sump. In the second embodiment, the attaching/detaching member 130 is disposed on a lateral side of the reservoir tank 120.

The reservoir tank 120 reserves electrolytic solution to be supplied to the air battery 110 that is attached to the attaching/detaching member 130 (described in detail below), and is configured in the shape of a vertically-long cuboid having a suitable volume according to the size of the air battery 110.

The attaching/detaching member 130 is disposed at an intermediate part of a side wall 121 of the reservoir tank 120, detachably holds the air battery 110, and has a sufficient volume to contain the reaction product produced in the attached air battery 110. This structure prevents an increase in inner pressure of the air battery 110.

As with the above-described air batteries 20, the air battery 110 includes a cathode and an anode disposed on front and back faces (upper and lower faces in the figure) of a separator, and a liquid tight/gas permeable membrane (hereinafter, referred to as a "waterproof membrane") laminated on the outer face of the cathode.

A supply pipe 112 for supplying the electrolytic solution is connected between a side part 131 of the attaching/detaching member 130 and a side part 111 of the air battery 110. Specifically, one end of the supply pipe 112 is connected to the side part 131 of the attaching/detaching member 130, and the other end is connected to the side part 111 of the air battery 110 at a position closer to the end opposite the attaching/detaching member 130. At one end of the supply pipe 112, a check valve 113 is disposed which opens only when the electrolytic solution is supplied to the air battery 110. In the second embodiment, the check valve 113 serves as a backflow preventing member.

In the air battery system A2 with the above-described configuration, the pressure and vibration generator 40 presses the attaching/detaching member 130 so as to inject the electrolytic solution into the air battery 110 through the check valve 113.

By injecting the electrolytic solution into the air battery 110, the reaction product in the air battery 110 is flushed out to the attaching/detaching member 130 together with the electrolytic solution and is then precipitated in the attaching/detaching member 130. Meanwhile, the volume of the attaching/detaching member 130 increases (expands) due to its bellows structure, and thereby an increase in inner pressure can be prevented. If the pressure is released, the check valve 113 prevents the electrolytic solution in the air battery 110 from flowing back through the supply pipe 112.

After a given time period has elapsed, the pressure and vibration generator 40 causes a vibration in the reservoir tank 120. The vibration promotes circulation of the electrolytic solution in the air battery 110.

The present invention is not limited to the above-described embodiments, and the following modifications may be made.

In order to control the flow of the electrolytic solution from the air battery to the reaction product sump, a flow control valve may be provided.

The flow control valve includes a control valve with a throttle mechanism and a driver (actuator) that operates an inner valve of the control valve according to a control signal (operation signal). The flow control valve can be controlled by the controller C.

In the above-described embodiments, the reaction product sump is provided as a part of the reservoir tank. However they may be provided separately from each other.

While the present invention is described in detail, in any case, the components of the above-described embodiments may be applied not only to their original embodiment but also to the other embodiments with or without modifications. Furthermore, these components may be combined suitably.

The invention claimed is:

1. An air battery system comprising:
   an air battery;
   a reservoir tank to reserve electrolytic solution to be supplied to the air battery; and
   a reaction product sump to store a reaction product produced in the air battery provided between the air battery and the reservoir tank, wherein the reaction product sump is elastically deformable according to an increase of an inner pressure due to production of the reaction product.

2. The air battery system according to claim 1, wherein the air battery, the reaction product sump and the reservoir tank are arranged in descending order along a direction of a gravity vector.

3. The air battery system according to claim 1, further comprising:
   a supply pathway to supply the electrolytic solution from the reaction product sump to the air battery; and
   a backflow preventing member disposed on the supply pathway configured to prevent backflow of the electrolytic solution from the air battery to the reaction product sump.

4. The air battery system according to claim 1, further comprising:
   a flow control valve to control flow of the electrolytic solution from the air battery to the reaction product sump.

5. An air battery system comprising:
   an air battery;
   a reservoir tank to reserve electrolytic solution to be supplied to the air battery;
   an attaching/detaching member configured to detachably hold the air battery and to serve as a reaction product sump for storing a reaction product produced in the attached air battery, wherein the attaching/detaching member is provided between the air battery and the reservoir tank; and
   a pressure and vibration generator configured to cause a pressure and a vibration in the reservoir tank or the attaching/detaching member.

6. An air battery system comprising:
   an air battery;
   a reservoir tank to reserve electrolytic solution to be supplied to the air battery; and
   a reaction product sump to store a reaction product produced in the air battery provided between the air battery and the reservoir tank, wherein the reaction product sump comprises an expandable/shrinkable structure that expands/shrinks according to an inner pressure.

7. The air battery system according to claim 6, wherein the air battery, the reaction product sump and the reservoir tank are arranged in descending order along a direction of a gravity vector.

8. The air battery system according to claim 6, further comprising:
   a supply pathway to supply the electrolytic solution from the reaction product sump to the air battery; and
   a backflow preventing member disposed on the supply pathway configured to prevent backflow of the electrolytic solution from the air battery to the reaction product sump.

9. The air battery system according to claim 6, further comprising:
   a flow control valve to control flow of the electrolytic solution from the air battery to the reaction product sump.

* * * * *